United States Patent [19]
Babcock

[11] 4,207,516
[45] Jun. 10, 1980

[54] SWITCHING REGULATOR WITH REDUCED INRUSH CURRENT

[75] Inventor: William E. Babcock, Warren, N.J.
[73] Assignee: RCA Corporation, New York, N.Y.
[21] Appl. No.: 937,568
[22] Filed: Aug. 28, 1978
[51] Int. Cl.² ............................................. G05F 1/56
[52] U.S. Cl. ...................................... 323/9; 323/17; 323/34; 363/49
[58] Field of Search ................... 323/9, 22 SC, 34, 36; 363/49, 86, 128

[56] References Cited

U.S. PATENT DOCUMENTS

| | | | |
|---|---|---|---|
| 3,377,542 | 4/1968 | Glorioso | 363/88 |
| 3,412,314 | 11/1968 | Crane | 363/86 |
| 3,555,361 | 1/1971 | Hallberg | 361/58 |
| 3,562,621 | 2/1971 | Schaefer | 323/22 SC |
| 3,601,688 | 8/1971 | Dogadko et al. | 323/22 SC |
| 3,769,568 | 10/1973 | Hamilton et al. | 363/49 X |
| 3,783,367 | 1/1974 | Yamamoto et al. | 323/22 SC |
| 3,914,685 | 10/1975 | Van Gilder | 323/20 |
| 3,947,751 | 3/1976 | Bray | 323/34 X |
| 3,947,754 | 3/1976 | Wechsler | 323/22 SC |
| 3,996,506 | 12/1976 | Kichak | 363/50 |
| 4,011,498 | 3/1977 | Hamstra | 323/36 X |
| 4,091,434 | 5/1978 | Suzuki et al. | 363/53 X |

OTHER PUBLICATIONS

Schematic of Power Supply, Bang and Olufsen Color TV Receiver, Beovision 3702, 4402, 6002, Type 3528, 3521, 3530, Jan. 1977.
Jensen, "Colour Receiver Design", Wireless World, Jul. 1978, pp. 51–54.
G. E. SCR Manual, 3rd Edition, 1964, pp. 131–137, (A.U. 212).
King, "Monochrome TV Power Supplies for 117 and 220V Mains Input", Mullard Technical Communications, No. 102, Nov. 1969, pp. 26–28.
King, "Thyristor Power Supplies for Colour TV Receivers", Mullard Technical Communications, No. 102, Nov. 1969, pp. 29–34.
Babcock, "SCR-Regulated Power Supply", RCA Note ST-6191, Jun. 7, 1973.

*Primary Examiner*—A. D. Pellinen
*Attorney, Agent, or Firm*—Eugene M. Whitacre; Paul J. Rasmussen; Joseph J. Laks

[57] ABSTRACT

A switching regulator for regulating an input voltage having an alternating current component. Closure of the regulator switch is determined by a phase shifted switching signal obtained from a control network. In normal operation a varying bias signal coupled to the control circuit varies the phase shift of the switching signal to vary the instant of regulator switch closure. During startup, a capacitance coupled to the control circuit and to the input voltage provides an additional bias signal to delay the switching signal to prevent regulator switch closure during the peak magnitude of the alternating current input voltage component to thereby limit the peak inrush current in the regulator circuit.

12 Claims, 5 Drawing Figures

1

SWITCHING REGULATOR WITH REDUCED INRUSH CURRENT

BACKGROUND OF THE INVENTION

This invention relates to regulator circuits.

Switching regulators using silicon controlled rectifiers as the series switching element are gated into conduction at various rates. A common frequency is that of the AC line mains frequency or twice the mains frequency for full-wave rectified input voltages. Because the switching rate is relatively slow, relatively large filter capacitors are used.

Upon initial application of AC line mains voltage, large inrush currents may develop to charge the initially uncharged filter capacitors. To limit the peak inrush current, a series impedance such as a resistor, or thermistor inductor, may be used. Using a resistor undesirably dissipates power and reduces the regulation range. Using an inductor may require one with a relatively large and expensive core cross-section to prevent saturation of the core by the inrush current. Similarly costly is the use of a thermistor.

SUMMARY OF THE INVENTION

A switching regulator for regulating an input voltage having an alternating current component. Closure of the regulator switch is determined by a phase shifted switching signal obtained from a control network. In normal operation a varying bias signal coupled to the control circuit varies the phase shift of the switching signal to vary the instant of regulator switch closure. During startup, a capacitance coupled to the control circuit and to the input voltage provides an additional bias signal to delay the switching signal to prevent regulator switch closure during the peak magnitude of the alternating current input voltage component to thereby limit the peak inrush current in the regulator circuit.

DESCRIPTION OF THE INVENTION

Figure 1:
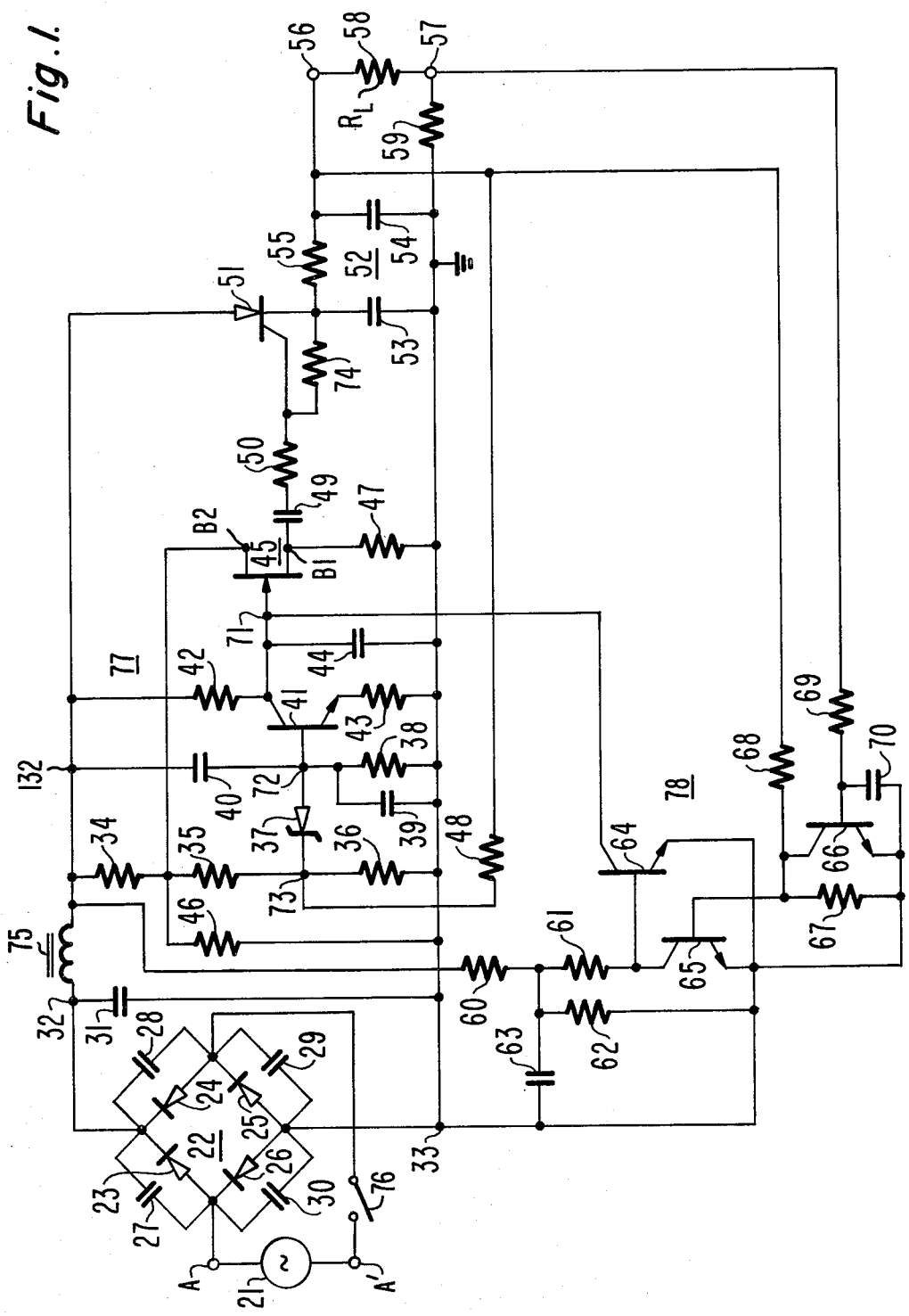
FIG. 1 illustrates a regulator circuit embodying the invention.

In FIG. 1, a source of alternating current voltage 21 such as 120 VAC, 60Hz, AC line mains voltage is coupled to terminals A-A'. A full-wave bridge rectifier 22 comprises diodes 23–26 with terminals A being coupled to the junction of diodes 23 and 26, and terminal A' being coupled to the junction of diodes 24 and 25 through an ON-OFF switch 76. An output terminal 32 of rectifier 22 comprises the junction of diodes 23 and 24. A common ground return terminal 33 comprises the junction of diodes 25 and 26.

Bypass capacitors 27–30 are coupled across respective diodes 23–26. An RF bypass capacitor 31 is coupled across terminals 32 and 33. An inductor 75 of relatively small inductance value is coupled between terminal 32 and a terminal 132 coupled to the anode of a regulator switch SCR 51. The cathode of SCR 51 is coupled to a pi filter 52 comprising shunt capacitors 53 and 54 and series resistor 55. Alternatively, the series impedance for filter 52 may comprise an inductor.

A regulated relatively low-ripple DC output voltage of illustratively +120 VDC is developed at a terminal 56, the junction of resistor 55 and capacitor 54. A load $R_L$, illustratively shown as a resistor 58 is coupled between output terminal 56 and ground through a current sensing resistor 59.

Figure 2A:
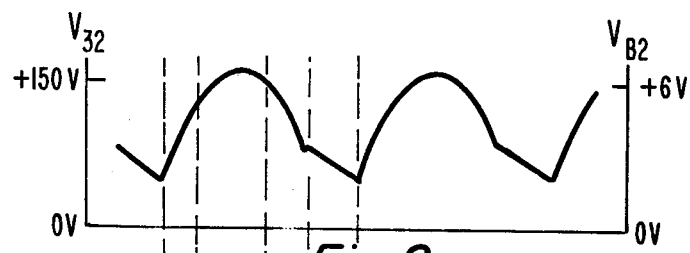
FIGS. 2a–2d illustrate waveforms associated with the circuit of FIG. 1.

A pulsating DC input voltage $V_{32}$ of FIG. 2a at terminal 32 is coupled to filter 52 when SCR 51 conducts. A regulator control circuit 77 varies the conduction angle of SCR 51 to maintain output terminal 56 at the regulated DC voltage level despite changes in AC line voltage and load current magnitude.

As illustrated in FIG. 2a, the pulsating DC voltage $V_{32}$ is generally a full-wave rectified sinewave voltage superimposed on a DC offset voltage, a complete input cycle of voltage $V_{32}$ occurring between times $T_1$–$T_5$. The amount of DC offset is a function in-part of the initial partial filtering performed by bypass capacitor 31 and of the amount of load current being drawn by $R_L$. The voltage $V_{32}$ is not purely sinuosoidal because of the wave-shaping performed by capacitor 31 and inductor 75 in response to the conduction of SCR 51 during the latter portion of the cyclical interval $T_1$–$T_5$ of voltage $V_{32}$. Because inductor 75 is relatively small valued, the voltage at terminal 132 may also be represented approximately by the voltage waveform $V_{32}$.

The voltage $V_{32}$ at terminal 132 is coupled with relatively little phase-shift to the base B2 of a uni-junction transistor (UJT) 45 from the junction of resistors 34 and 46 which form a voltage divider. Thus, the voltage $V_{B2}$ at base B2 is relatively similar in waveshape to voltage $V_{32}$ but of a lower voltage divided amplitude and may be approximately represented by the waveform illustrated in FIG. 2a. Omitted from illustration of $V_{B2}$, are any voltage transients occurring due to conduction of UJT 45. A base B1 of UJT 45 is coupled to ground through a resistor 47.

The emitter of UJT 45 is coupled to a junction terminal 71 of a phase delaying or integrating network coupled to terminal 132 comprising a resistor 42 and a capacitor 44. A variable current source or drain comprising the collector-emitter path of a control transistor 41 and resistor 43 is coupled across capacitor 44.

A first feedback voltage representative of the DC output voltage is coupled from terminal 56 to an input terminal 72 at the base of control transistor 41 through a feedback resistor 48 and a level-clipping zener diode 37. A resistor 38 is coupled from terminal 72 to ground. A second feedback voltage coupled to input terminal 72 and representative of AC line amplitude is developed at a terminal 73 of a voltage divider comprising resistors 34–36 and peak clipped by zener diode 37, and a capacitor 39 coupled to terminal 72. Capacitor 39 also prevents low frequency positive feedback oscillation from occurring from the output voltage feedback. The AC component of pulsating DC voltage $V_{32}$ is capacitively coupled to the base of transistor 41 through a capacitor 40.

UJT 45 will trigger into conduction when the voltage $V_{71}$ exceeds the peak point unijunction emitter voltage $V_p$ of the unijunction transistor, that is approximately when $V_{71} > V_p = V_d + \eta V_{B2}$, where $V_d$ equals the P-N forward voltage drop and where $\eta$ is the intrinsic standoff ratio and equals a fraction such that $0 < \eta < 1$. The fraction $\eta$ is a device characteristic of the particular unijunction transistor used. The voltage $V_{B2}$ represents the directly coupled pulsating voltage $V_{32}$. The voltage $V_{71}$ at the emitter of UJT 45, however, is integrated or phase delayed by capacitor 44 with respect to $V_{B2}$, as illustrated in FIG. 2c from about times $T_1$–$T_3$.

During the latter portion of the input cycle $T_1$–$T_5$, near time $T_3$, $V_{B2}$ has decreased sufficiently and $V_{71}$ has increased sufficiently such that $V_{71}$ exceeds the peak point unijunction emitter voltage $V_p$. UJT 45 then triggers into conduction. Capacitor 44 discharges through the emitter-base B1 junction of UJT 45. This discharge current is coupled through a capacitor 49 and resistor 50 to gate regulator SCR 51 into conduction. A resistor 74 is coupled across the gate and cathode of SCR 51.

With SCR 51 gated into conduction near time $T_3$, input voltage $V_{32}$ is coupled to filter 52 for maintaining a regulated DC output voltage at terminal 56. As illustrated in FIG. 2d, the input current $i_{51}$ flowing through SCR 51 begins near time $T_3$ and flows until time $T_4$ at which time the current $i_{51}$ has decreased below the SCR holding current level. The function of inductor 75 in part is to widen the conduction angle of SCR 51 in order to decrease RF radiation and RMS current dissipation.

After time $T_3$, capacitor 44 discharges relatively quickly through UJT 45 and resistor 47 until the emitter-base B1 region of UJT 45 returns to a standoff condition, at which time capacitor 44 begins recharging. As illustrated in FIG. 2c, a series of relatively rapid charge-discharge cycles of capacitor 44 occurs during the remainder of the input cycle from about times $T_3$–$T_5$, as the emitter of UJT 45 cycles between saturated conduction and standoff.

Because of the rapid charge-discharge of capacitor 44 during the interval $T_3$–$T_5$, the slowly varying component of the voltage $V_{71}$ follows in-phase the input voltage $V_{32}$, reaching a minimum at the beginning of the subsequent input cycle, near time $T_5$. The slowly varying portion of voltage $V_{71}$ being inphase during the interval $T_3$–$T_5$ resynchronizes voltage $V_{71}$ with input voltage $V_{32}$ at the beginning of the next input cycle to permit UJT 45 to trigger during the latter portion of the next input cycle.

The exact instant of triggering of UJT 45 to provide phase shifted switching signals to SCR 51 is a function of the delay provided by the phase delaying or integrating network comprising resistor 42, capacitor 40 and the shunting current source of control transistor 41. As mentioned, previously, the voltage $V_{32}$ is coupled directly to base B2 of UJT 45 but is coupled to the emitter of UJT 45 through the integrating network. Thus, unijunction transistor 45 may be considered a phase comparator. Varying the bias on control transistor 41 will vary the amount of integration provided by capacitor 44. A decreased DC output voltage, for example, decreases the DC bias to transistor 41, decreases the shunt current through transistor 41 and advances the triggering instant $T_3$ of UJT 45 closer to the peak of the input voltage $V_{32}$. SCR 51 begins conducting at an instant of greater input voltage, increasing the charging current into filter 52, and increasing the output voltage $V_{56}$ as required. The triggering instant $T_3$ will similarly be advanced for low AC line conditions and retarded for high AC line conditions and increased DC output voltage. Devices or circuits other than unijunction transistors may be used, such as diacs or programmable unijunction transistors.

A shutdown circuit 78 comprising transistors 64-66, prevents triggering of UJT 45 and conduction of SCR 51 under overload conditions. A current overload, for example, increases the voltage at a terminal 57 coupled to current sensing resistor 59. The increased voltage is coupled to the base of transistor 66 through a resistor 69. Capacitor 70 prevents transient voltage increases at terminal 57 from activating shutdown circuit 78. With transistor 66 conducting, the current at the junction of voltage dividing resistors 67 and 68 and obtained from output terminal 56 is shunted away from the base of transistor 65, thereby turning off transistor 65. Current from terminal 132 now flows to the base of transistor 64 through a resistor 60 and a resistor 61, turning on transistor 64. Capacitor 63 coupled to the junction of resistors 60 and 61 provides transient filtering. Also, capacitor 63 in conjunction with resistor 60 provides a delay in the application of base bias to transistor 64 at the instant of switch 76 closure. With this delay, transistor 64 is not driven into saturation immediately upon switch 76 closure, providing for normal regulator operation. Resistor 62 provides a discharge path for capacitor 63 when switch 76 is opened.

With transistor 64 conducting, terminal 71 is coupled to ground through the collector of transistor 64, preventing UJT 45 from triggering and maintaining SCR 51 nonconducting. The DC output voltage decreases. Thus, even if the overload condition ceases and transistor 66 cuts off, no base current will flow to transistor 65 due to the decrease in the DC output voltage. Transistor 64 remains conducting and shutdown circuit 78 remains activated until ON-OFF switch 76 is open-circuited thereby deenergizing shutdown circuit 78.

The above description of regulator control circuit 77 involves steady state operation, after the capacitors of control circuit 77, such as capacitors 39 and 44, and those of filter 52 have been charged to their steady state DC value. During an initial inrush interval, immediately following closure of ON-OFF switch 76, when SCR 51 is made conductive, relatively large inrush currents may flow to charge the initially uncharged filter capacitors 53 and 54. Because of the relatively large inrush currents, typically 20 to 40 times the peak of the steady state input current $i_{51}$, the core of inductor 75 may saturate, removing any substantial series impedance to the inrush current.

Furthermore, during this initial interval, the voltage at output terminal 56 is zero providing no DC output feedback bias to control transistor 41. Also, with capacitor 39 initially uncharged, no DC bias can be applied to the base of transistor 41 until the relatively long RC time constant associated with capacitor 39 permits the capacitor to charge to a substantial voltage. Similarly very little of the peak rectified $V_{32}$ voltage at terminal 73 will be coupled to terminal 72.

Neglecting for the moment the effect of the portion of the input voltage capacitively coupled from terminal 132 through capacitor 40, with little DC biasing available during the initial interval, control transistor 41 will shunt relatively little current away from capacitor 44. The integrating network will provide maximum integration of voltage $V_{71}$ with respect to the voltage $V_{B2}$. Thus, depending on the exact closure instant of ON-OFF switch 76 within the input cycle of voltage $V_{32}$, UJT 45 may be triggered at its most advanced instant near the peak of the input voltage $V_{32}$. A relatively large inrush current will be produced, producing undesirable stress on such components as SCR 51 and diodes 23-26.

With capacitor 40 coupled from terminal 132 to terminal 72, a capacitive voltage divider with capacitor 39 is formed. A voltage $V_{40}$ representative of voltage $V_{32}$ is coupled by capacitor 40 to terminal 72 even during the initial inrush interval. This component voltage $V_{40}$ during the initial interval is similar in waveshape to the AC component of $V_{72}$ illustrated in FIG. 2b. Although FIG. 2b illustrates $V_{72}$ for steady state conditions, the AC component of $V_{72}$ is similar to the AC component of $V_{40}$ during the initial interval except from times $T_3$–$T_4$ during the steady state when SCR 51 is conducting and couples the DC output voltage to terminal 132.

Figure 2B:
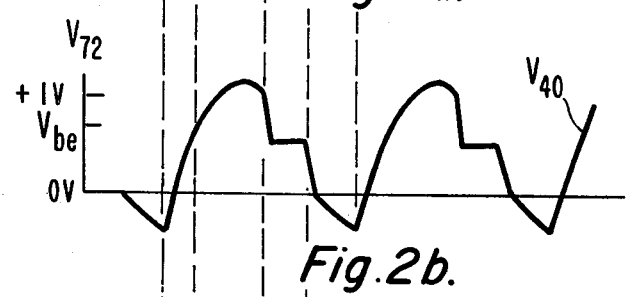
Figure 2C:
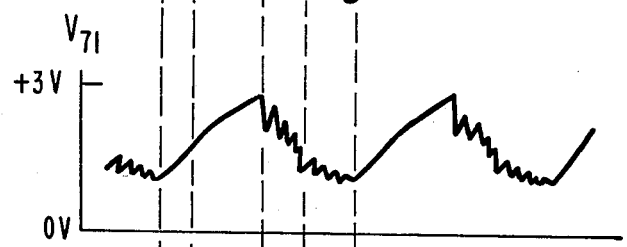
Figure 2D:
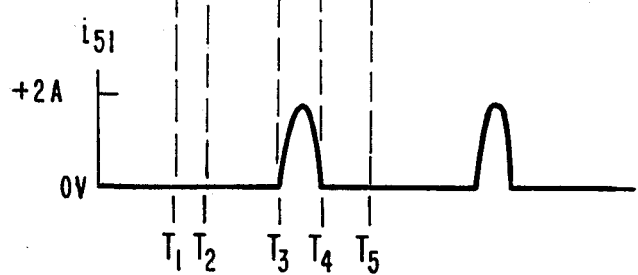

As illustrated in FIG. 2b during steady state conditions, near time $T_4$, the AC component of $V_{72}$ has increased sufficiently such that $V_{72}$ exceeds the $V_{be}$ voltage necessary to turn on transistor 41. The turn-on instant $T_2$ of transistor 41 is varied by changing, for example, the DC bias level obtained from the various feedback voltages, thereby varying the amount of conduction of transistor 41 and the current shunting across capacitor 44 for providing the required regulation.

The effect of the AC component of $V_{72}$ is to provide an additional bias to control transistor 41 which supplements the varying DC feedback biases. Even though regulation during steady state is achieved by varying the DC feedback bias, the value of capacitor 40 is selected to provide sufficient additional bias during the initial interval to maintain a minimum conduction of control transistor 41 when the DC feedback bias is absent or reduced during the initial interval.

As mentioned previously, during the initial interval, the DC feedback from output terminal 56 is zero, and without the additional bias provided by $V_{40}$, depending on the exact closure instant of ON-OFF switch 76, UJT 45 may undesirably trigger at an advanced instant near the peak of input voltage $V_{32}$.

With the additional bias $V_{40}$ coupled by capacitor 40, however, an irreducible amount of conduction of control transistor 41 occurs during the initial interval as determined by the capacitive voltage division of capacitors 39 and 40. Current is shunted away from integrating capacitor 44, and despite the instant of closure of ON-OFF switch 76, UJT 45 cannot trigger as near in time to the peak of input voltage $V_{32}$ as it could have triggered had no additional bias been provided. Thus the additional bias prevents conduction of SCR 51 at the peak of the input voltage during the initial interval, providing for reduced peak inrush currents.

After the initial interval has elapsed, the normal DC feedback biases are established at terminal 72 when zener diode 37 becomes conductive by the resistive DC voltage divider of resistors 34–36, 46 and 48. The AC or capacitive voltage divider that provides voltage $V_{40}$ is now constrained to assume DC component voltage levels that are established by the DC voltage divider, thus reducing the effect of the AC voltage 40 coupled through capacitor 40. Regulator control circuit 77 can now provide a normal regulator control range for the phase shifted switching signals.

Selected component values for the circuit of FIG. 1 are listed below.

| Resistor | 34 = 13.5K | Capacitor | 27 = 0.001 | μF |
|---|---|---|---|---|
| | 35 = 39K | | 28 = 0.001 | μF |
| | 36 = 7.7K | | 29 = 0.001 | μF |
| | 38 = 4.7K | | 30 = 0.001 | μF |
| | 42 = 300K | | 31 = 0.22 | μF |
| | 43 = 1.5K | | 39 = 5 | μF |
| | 46 = 680 | | 40 = 0.068 | μF |
| | 47 = 1K | | 44 = 0.27 | μF |
| | 48 = 120K | | 49 = 0.22 | μF |
| | 50 = 22 | | 53 = 750 | μF |
| | 55 = 7.5 | | 54 = 950 | μF |
| | 58 = 500 | Inductor | 75 = 8 | mH |

| | | |
|---|---|---|
| | 59 = 0.82 | |
| Zener diode | 37 = | 1N5235, 6.8V |
| Transistor | 41 = | 2N4124 |
| UJT | 45 = | 2N4893 |
| SCR | 51 = | RCA S3705M |

The peak inrush current using capacitor 40 to couple an additional bias voltage to control transistor 41 was reduced from approximately 75 amps to 44 amps.

What is claimed is:

1. A regulator circuit with reduced inrush current, comprising:
   a source of operating voltage, said operating voltage including an alternating current component;
   switching means coupled to said source and an output terminal for providing an output voltage and responsive to a phase shifted switching signal which signal controls the conduction of said switching means;
   a source of charging current;
   a charging capacitor coupled to said source of charging current and said switching means for producing said phase shifted switching signal;
   control means coupled to one of said charging capacitor and said source of charging current and responsive to bias signals coupled to a first terminal of said control means for varying the charging rate of said charging capacitor for varying said phase shifted switching signal;
   a DC voltage divider coupled to said output voltage for direct current coupling to said first terminal a steady state bias voltage representative of said output voltage during a steady state interval for regulating said output voltage;
   an AC voltage divider coupled to said operating voltage for capacitively coupling said operating voltage to said first terminal for providing an initial interval bias voltage of such value as to sufficiently phase shift said switching signal during said initial interval in a manner that will substantially reduce the inrush current during start-up; and
   means for decoupling said DC voltage divider from said AC voltage divider during said initial interval for preventing the voltage at said output terminal during said initial interval from affecting said initial interval bias voltage, said AC voltage divider constrained to assume a DC component bias voltage level during said steady state interval that is provided by said steady state bias voltage.

2. A circuit according to claim 1 wherein said means for capacitively coupling comprises a capacitive voltage divider coupled to said source of operating voltage, said first terminal coupled to a junction of said capacitive voltage divider.

3. A circuit according to claim 2 wherein said control means comprises:
   a phase comparator, the output of which comparator is coupled to said switching means;
   a reference signal coupled to an input terminal of said comparator;
   integrating means responsive to said operating voltage for providing a phase shifted input signal to an input terminal of said comparator; and first means responsive to said first bias signal and to said additional bias signal for varying the amount of integration performed by said integrating means.

4. A regulator circuit with reduced inrush current, comprising:

a source of input voltage, said input voltage including an alternating current component;

switching means coupled to said source and an output terminal and responsive to a switching signal for providing an output voltage;

a comparator coupled to said switching means for providing said switching signal at a predetermined instant within a cycle of said alternating current component;

phase shifting means coupled to said source and said comparator for providing said comparator with a phase shifted signal that is phase shifted with respect to the phase of said alternating current component for establishing said predetermined instant;

control means coupled to said phase shifting means and responsive to a bias signal for varying the phase shift of said phase shifting signal for varying the conduction of said switching means;

first feedback means including a DC voltage divider coupled to said output voltage for providing after the elapse of a start-up interval a DC bias component of said bias signal that is representative of said output voltage for regulating said output voltage;

additional feedback means including an AC voltage divider coupled to said input voltage for capacitively coupling an initial bias component to said control means during said start-up interval for delaying said predetermined instant sufficiently to substantially reduce inrush current during said start-up interval; and means for decoupling said first feedback means from said additional feedback means for decoupling said DC bias component from said initial bias component during said start-up interval, said bias signal constrained to assume the level of said DC bias component after the elapse of said start-up interval.

5. A circuit according to claim 4, wherein said decoupling means comprises a voltage reference source coupled between junction terminals of said DC and AC voltage dividers, and including second feedback means direct current coupling said input voltage in series with said voltage reference source and said control means.

6. A circuit according to claim 4 wherein said input voltage is direct current coupled to said comparator for phase comparing said input voltage with said phase shifted signal.

7. A circuit according to claim 6 wherein said comparator comprises a unijunction transistor.

8. A circuit according to claim 6 wherein phase shifting means comprises an integrating network including an integrating capacitor.

9. A circuit according to claim 8 wherein said control means comprises a variable current source for shunting a variable amount of current from said integrating capacitor in response to said bias signal.

10. A circuit according to claim 9 including a capacitor coupled to said second feedback means for peak rectifying said input voltage.

11. A circuit according to claim 10 wherein said comparator comprises a unijunction transistor.

12. A regulator, comprising:

an input terminal suitable for coupling to a source of energy that includes an alternating current component;

an output terminal for providing an output voltage to a load;

switching means coupled to said input and output terminals for controlling the amount of energy coupled from said source to said output terminal;

triggering means coupled to said switching means and responsive to a control signal coupled to said triggering means for switching said switching means into conduction during each cycle of said alternating current component;

an integrating network coupled to said triggering means and responsive to said alternating current component for integrating said alternating current component for providing said control signal;

first means coupled to said integrating network and responsive to a bias signal coupled to said first means for varying the amount of integration performed by said integrating network for varying the conduction angle of said switching means for regulating said output voltage;

first feedback means including a DC voltage divider coupled to said output voltage for providing after the elapse of a start-up interval a DC bias component of said bias signal that is representative of said output voltage for regulating said output voltage;

additional feedback means including an AC voltage divider coupled to said source of energy for capacitively coupling an initial bias component to said first means during said start-up interval for delaying conduction of said switching means sufficiently to substantially reduce inrush current during said start-up interval; and means for decoupling said first feedback means from said additional feedback means for decoupling said DC bias component from said initial bias component during said start-up interval, said bias signal constrained to assume the level of said DC bias component after the elapse of said start-up interval.

* * * * *